United States Patent Office 3,845,046
Patented Oct. 29, 1974

3,845,046
N-TERTIARY-4-AMINOMETHYL-DIBENZO(b,e)-11-OXEPINE-2'-SPIRO-1',3'-DIOXOLANES
Claude P. Fauran and Guy M. Raynaud, Paris, Jeannine A. Eberle, Chatou, Bernard M. Pourrias, Meudon-la-Foret, and Albert Y. Le Cloarec, Saint-Maur, France, assignors to Delalande S.A., Henri-Regnault, France
No Drawing. Filed May 25, 1972, Ser. No. 256,655
Claims priority, application France, May 28, 1971, 7119501; Mar. 23, 1972, 7210250
Int. Cl. C07d 21/00
U.S. Cl. 260—247.5 R    9 Claims

ABSTRACT OF THE DISCLOSURE

A compound of the formula

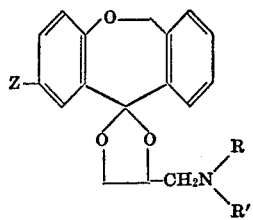

wherein Z is hydrogen, alkoxy having from 1 to 4 carbon atoms, or halogen; and R and R' each represent alkyl having from 1 to 3 carbon atoms, or

is pyrrolidino, piperidino, morpholino, hexamethyleneimino or piperazino, the piperazino radical being N'-substituted with alkyl having 1 to 3 carbon atoms which alkyl is optionally substituted with one or two hydroxyl groups, or by an aminocarbonylmethyl radical the nitrogen atom of which is optionally substituted by one or two alkyls having 1 to 3 carbon atoms or belongs to a pyrroldino, morpholino, or hexamethyleneimino group. The compounds possess analgesic, respiratory analeptic, bronchodilatory, antitussive, anti-inflammatory, spasmolytic, vasodilatatory, hypotensive, antihistaminic, atropinic, neuroleptic, tranquilizing, sedative, diuretic and capillary permeability modifying properties.

---

The present invention relates to novel compounds, which are N-tertiary-4 - aminomethyl-dibenzo[b,e]-11-oxepine-2'-spiro-1',3'-dioxolanes.

The compounds correspond to the formula:

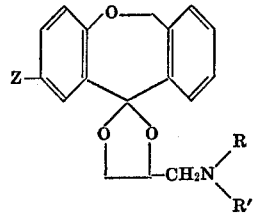

in which:
Z represents a hydrogen atom, an alkoxy radical having from 1 to 4 carbon atoms, or a halogen atom; and
R and R' each represent an alkyl radical having from 1 to 3 carbon atoms, or R and R' together with the nitrogen atom to which they are attached, form a pyrrolidino, piperdino, morpholino, a hexamethylene-imino or a piperazine radical, said piperazino radical being N'-substituted by an alkyl radical having 1 to 3 carbon atoms optionally substituted by one or two hydroxy groups or by an aminocarbonylmethyl radical the nitrogen atom of which is optionally substituted by one or two alkyl radicals having 1 to 3 carbon atoms or belongs to an heterocyclic radical selected from: pyrrolidino, morpholino, hexamethyleneimino.

The process according to the invention comprises, in a first stage, reacting 6H-dibenzo[b,e]-oxepine-11-one, optionally substituted in the 2-position, and corresponding to the formula:

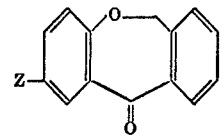

in which Z has the same signification as in formula (I), with epibromohydrin of formula:

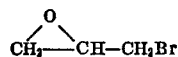

in the presence of tin tetrachloride, and then in a second stage, reacting the 4'-bromomethyl-dibenzo[b,e]-11-oxepine-2'-spiro-1',3'-dioxolane, optionally substituted in the 2-position, thereby obtained of formula:

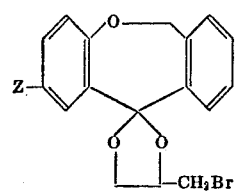

with an amine of formula:

in which R and R' have the same significance as in formula (I).

The following preparation is described by way of example to illustrate the invention.

EXAMPLE 4-pyrrolidinomethyl-dibenzo[b,e]-11-oxepine-2'-spiro 1',3'-dioxolane maleate (Code No. 7135)

1ST. STAGE

Preparation of 4'-bromomethyl-dibenzo[b,e]-11-oxepine-2'-spiro-1',3'-dioxolane. A solution of 0.36 mol. of epibromohydrin in 100 ml. of chloroform is added, over a period of five hours whilst maintaining the temperature below 20° C., to a solution of 0.3 mole of 6H-dibenzo[b,e]-oxepine-11-one and 12.2 g. of tin tetrachloride in 300 ml. of chloroform, cooled to 15° C. After treating the reaction mixture with 50 cc. of 10 N NaOH, the organic layer is separated, washed with water, dried, evaporated and distilled. 4'-Bromomethyldibenzo[b,e]-11-oxepine-2'-spiro-1',3'-dioxolane is obtained in crude form in a yield of 52%.

2ND STAGE

Preparation of 4'-pyrrolidinomethyl-dibenzo[b,e]-11-oxepine-2'-spiro-1',3'-dioxolane. 33 g. of the compound prepared in the 1st stage is mixed with 31 g. of pyrrolidine in 100 ml. of benzene. The solution is maintained under benzene reflux for 8 hours. An equivalent of soda is then added, and the product is washed with water, dried, evaporated and distilled.
The resultant compound is obtained in a yield of 82.5%.
Boiling point=210° C. under 0.1 mm. Hg.

3RD STAGE

*Preparation of 4'-pyrrolidinomethyl-dibenzo[b,e]-11-oxepine-2'-spiro-1',3'-dioxolane maleate.* The base obtained is converted to the maleate by the addition of an equivalent of maleic acid. The product obtained is recrystallised in 96° alcohol.

Melting point=168° C.

Yield=81%.

Empirical formula=$C_{25}H_{27}NO_7$.

Elementary analysis: Calculated (percent): C, 66.21; H, 6.00; N, 3.09. Found (percent): C, 66.35; H, 5.96; N, 3.27.

The compounds listed in the following Tables I, II and III have been prepared by the same methods of preparation

TABLE I

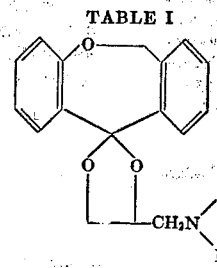

| Code No. | N(R)(R') | Form | Empirical formula | Molecular weight | Boiling point (° C./mm. Hg) | Melting point (° C.) | Yield (percent) | Calculated C | Calculated H | Calculated N | Found C | Found H | Found N |
|---|---|---|---|---|---|---|---|---|---|---|---|---|---|
| 7180 | —N(CH₃)₂ | Maleate | $C_{23}H_{25}NO_7$ | 427.44 | | 164 | 84 | 64.62 | 5.90 | 3.28 | 64.67 | 5.97 | 3.41 |
| 7155 | —N(C₂H₅)₂ | Base | $C_{21}H_{25}NO_3$ | 339.42 | 180–5/0.05 | | 63 | 74.31 | 7.42 | 4.13 | 74.13 | 7.29 | 4.24 |
| | | Oxalate | $C_{23}H_{27}NO_7$ | 429.45 | | 189 | 48 | 64.32 | 6.34 | 3.26 | 64.42 | 6.27 | 3.45 |
| 7135 | —N(pyrrolidinyl) | Maleate | $C_{25}H_{27}NO_7$ | 453.48 | | 168 | 81 | 66.21 | 6.00 | 3.09 | 66.35 | 5.96 | 3.27 |
| 7181 | —N(piperidinyl) | do | $C_{26}H_{29}NO_7$ | 467.50 | | 118 | 86 | 66.79 | 6.25 | 3.00 | 66.59 | 6.36 | 3.16 |
| 7156 | —N(morpholinyl) | do | $C_{25}H_{27}NO_8$ | 469.48 | | 166 | 91 | 63.95 | 5.80 | 2.98 | 64.15 | 5.60 | 3.13 |
| 71107 | —N(hexamethyleneimino) | Hydrochloride | $C_{21}H_{28}ClNO_3$ | 401.92 | | 199 | 41 | 68.73 | 7.02 | 3.49 | 68.83 | 7.02 | 3.63 |

TABLEAU I (SUITE)

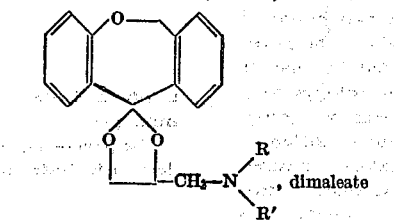

, dimaleate

| Code No. | N(R)(R¹) | Empirical formula | Molecular weight | Yield (percent) | Melting point (° C.) | Calculated C | Calculated H | Calculated N | Found C | Found H | Found N |
|---|---|---|---|---|---|---|---|---|---|---|---|
| 72133 | —N∪N—CH₃ | $C_{30}H_{34}N_2O_{11}$ | 598.58 | 50 | 178 | 60.19 | 5.73 | 4.68 | 59.98 | 5.84 | 4.84 |
| 72215 | —N∪N—CH₂—CHOH—CH₂OH | $C_{32}H_{38}N_2O_{13}$ | 658.64 | 18 | 148 | 58.35 | 5.82 | 4.25 | 58.23 | 6.04 | 4.45 |
| 72112 | —N∪N—CH₂—CO—NHCH₃ | $C_{32}H_{37}N_3O_{12}$ | 655.64 | 39 | 128 | (¹) | | | | | |
| 72135 | —N∪N—CH₂—CONH—CH(CH₃)₂ | $C_{34}H_{41}N_3O_{12}$ | 683.69 | 51 | 162 | 59.73 | 6.04 | 6.15 | 59.56 | 6.17 | 6.34 |
| 7262 | —N∪N—CH₂—CON(CH₃)₂ | $C_{33}H_{39}N_3O_{12}$ | 669.66 | 61 | 176 | 59.18 | 5.87 | 6.28 | 59.19 | 5.91 | 6.08 |
| 7245 | —N∪N—CH₂—CON(C₃H₇(n))₂ | $C_{37}H_{47}N_3O_{12}$ | 725.77 | 51 | 152 | 61.22 | 6.53 | 5.79 | 61.02 | 6.38 | 5.87 |
| 71576 | —N∪N—CH₂—CO—N(pyrrolidinyl) | $C_{35}H_{41}N_3O_{12}$ | 695.70 | 63 | 174 | 60.42 | 5.94 | 6.04 | 60.22 | 5.98 | 5.85 |

TABLE I—Continued

| Code No. | -N(R)(R¹) | Empirical formula | Molecular weight | Yield (percent) | Melting point (°C.) | Calculated C | Calculated H | Calculated N | Found C | Found H | Found N |
|---|---|---|---|---|---|---|---|---|---|---|---|
| 7205 | -N◯N-CH₂-CO-N◯O | C₃₅H₄₁N₃O₁₃ | 711.70 | 50 | 175 | 59.06 | 5.81 | 5.90 | 58.85 | 5.99 | 6.07 |
| 72141 | -N◯N-CH₂-CON◯ | C₃₇H₄₅N₃O₁₂ | 723.75 | 38 | 172 | 61.40 | 6.27 | 5.81 | 61.26 | 6.42 | 5.97 |
| 7284 | -N◯N-CH₂-CONHC₃H₇(η) | C₃₄H₄₁N₃O₁₂ | 683.69 | 56 | 160 | 59.73 | 6.04 | 6.15 | 59.54 | 6.22 | 6.24 |

¹ Protometry.—Acid, calculated: 35.4; Acid, found: 34.6; Base, calculated: 64.6; Base, found: 63.2; Water (Karl Fischer) 1.45.

TABLE II

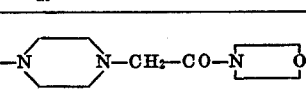

| Code No. | -N(R)(R') | Form | Empirical formula | Molecular weight | Melting point (°C.) | Calculated C | Calculated H | Calculated N | Found C | Found H | Found N |
|---|---|---|---|---|---|---|---|---|---|---|---|
| 71400 | -N(CH₃)(CH₃) | Oxalate | C₂₀H₂₃NO₄ | 341.39 | 74 | 70.36 | 6.79 | 4.10 | 70.18 | 6.67 | 4.29 |
| 71309 | -N◯ | Base | C₂₂H₂₅NO₄ | 367.42 | 90-91 | 71.91 | 6.86 | 3.81 | 71.72 | 6.77 | 3.93 |
| 71518 | -N◯O | Oxalate | C₂₄H₂₇NO₉ | 473.46 | ᵃ196 | 60.88 | 5.75 | 2.96 | 60.91 | 5.89 | 3.13 |
| 71454 | -N◯ | ...do | C₂₆H₃₁NO₈ | 485.51 | 155 | 64.32 | 6.44 | 2.89 | 64.12 | 6.51 | 3.06 |

ᵃ Decomposition.

TABLE III

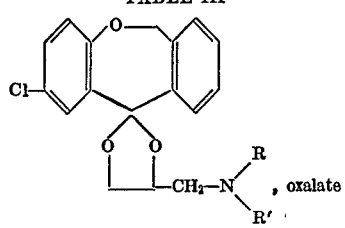

| Code No. | -N(R)(R') | Empirical formula | Molecular weight | Melting point (°C.) | Yield | Calculated C | Calculated H | Calculated N | Found C | Found H | Found N |
|---|---|---|---|---|---|---|---|---|---|---|---|
| 71365 | -N(CH₃)(CH₃) | C₂₁H₂₂ClNO₇ | 435.85 | 216 | 70 | 57.87 | 5.09 | 3.21 | 57.98 | 4.90 | 3.19 |
| 71367 | -N(C₂H₅)(C₂H₅) | C₂₃H₂₆ClNO₇ | 463.90 | 176 | 59 | 59.54 | 5.65 | 3.02 | 59.58 | 5.82 | 2.95 |
| 71268 | -N◯ | C₂₃H₂₄ClNO₇ | 461.88 | 203 | 45 | 59.80 | 5.23 | 3.07 | 59.60 | 5.10 | 3.21 |
| 71360 | -N◯ | C₂₄H₂₆ClNO₇ | 475.91 | ᵃ247 | 39 | 60.57 | 5.51 | 2.94 | 60.42 | 5.49 | 2.93 |
| 71396 | -N◯ | C₂₅H₂₈ClNO₇ | 489.93 | 196 | 50 | 71.28 | 5.76 | 2.86 | 61.44 | 5.94 | 2.75 |

ᵃ Decomposition.

The compounds of formula (I) have been studied on animals in the laboratory and have been shown to possess analgesic, respiratory analeptic, bronchodilatatory antitussive, anti-inflammatory, spasmolytic, vasodilatatory, hypotensive, antihistaminic, atropinic, neuroleptic, tranquillising, sedative, diuretic and capillary permeability modificational properties.

1. Analgesic properties

The compounds of formula (I), administered by oral means to mice, are capable of reducing the number of painful stretchings produced by the intraperitoneal injection of acetic acid or phenyl benzoquinone.

The results obtained with a certain number of compounds are given in the following Table IV.

TABLE IV

| Code No. of compound tested | Dose administered (mg./kg./PO) | Percentage protection against Phenyl benzoquinone | Acetic acid |
|---|---|---|---|
| 71268 | 100 | | 50 |
| 71360 | 100 | | 75 |
| 71365 | 5.5 | 50 | |
| 71396 | 100 | | 65 |
| 7156 | 100 | | 85 |
| 7180 | 40 | | 80 |
| 7181 | 50 | | 90 |
| 71107 | 100 | | 80 |

2. Respiratory analeptic properties

The compounds of formula (I), administered by intraveinous means to an anaesthetised guinea pig, are capable of opposing the respiratory depression provoked by morphine.

The results obtained with three of the compounds, administered in a dose of 2.5 mg./kg./IV are given in the following Table V:

TABLE V

| Code No. of compound tested | Increase in respiratory frequency | |
|---|---|---|
| | Intensity (percent) | Duration (mn.) |
| 71360 | 35 | >20 |
| 71367 | 75 | 30 |
| 71396 | 70 | 25 |

3. Antitussive properties

The compounds of formula (I), administered by intraveinous and intraduodenal means reduce the coughing provoked by stimulation of the upper laryngeal nerve in the anaesthetised cat.

By way of examples, the results obtained with a certain number of the compounds are given in the following Table VI:

TABLE VI

| Code No. of compound tested | Dose administered | Reduction of coughing | |
|---|---|---|---|
| | | Intensity (percent) | Duration |
| 7135 | 30 mg./kg./ID | 75 | 45 mn. |
| 7155 | 1 mg./kg./IV | 70 | 35 mn. |
| 7156 | 1 mg./kg./IV | 80 | 40 mn. |
| 7180 | 2 mg./kg./IV | 60 | 60 mn. |
| 7181 | 1 mg./kg./IV | 60 | 3 h. |
| 71107 | 500 µg./kg./IV | 40 | 45 mn. |

4. Bronchodilatatory properties

The compounds of formula (I), injected by intraveinous means, are capable of opposing the bronchoconstriction provoked in the guinea pig by the intraveinous injection of acetylcholine and evaluated according to the Konzett method.

Also, in a dose of 500 µg./kg./IV, the compound No. 7180 inhibits the bronchoconstriction by 50%.

5. Anti-inflammatory properties

These properties are shown by a diminution of the underplanatary oedema provoked by the local injection of a phlogogenic agent, such as carraghenine, to a rat following oral administration of the compounds of formula (I).

The results obtained with certain of the compounds are given in the following Table VII:

TABLE VII

| Code No. of compound tested | Dose administered (mg./kg./PO) | Percentage diminution of the oedema |
|---|---|---|
| 71268 | 100 | 50 |
| 71365 | 50 | 55 |
| 71367 | 100 | 65 |
| 71396 | 100 | 50 |

6. Spasmolytic properties

The compounds of formula (I), introduced in the conserving medium, are capable of opposing the contractural action of barium chloride on the isolated duodenum of the rat.

By way of example the DE 50 of compound No. 71360 is 25 µg. per ml. of conserving medium, and of compound No. 71365 is 2.5 µg. per ml. of conserving medium.

This activity is evaluated by taking papaverine as standard.

The results obtained with several compounds of formula (I), expressed in this manner, are given in the following Table VIII:

TABLE VIII

| Code No. of compound tested | Spasmolytic activity |
|---|---|
| 7135 | 2.5× papaverine. |
| 7155 | 10× papaverine. |
| 7180 | 14× papaverine. |
| 7181 | 1.5× papaverine. |
| 71107 | 5× papaverine. |

7. Vasodilatatory properties

The compounds of formula (I) are capable of augmenting the flow of the coronary vessels of the isolated heart of a guinea-pig when said compounds are added in the perfusion liquid of said organ.

The compounds Nos. 7155, 7156 and 7180 in a dose of 2.5 µg./ml. in the perfusion liquid, augment the flow of coronary vessels by 85, 40 and 70%, respectively.

8. Hypotensive properties

Administered by intraveinous means to an anaesthetised rat, the compounds of formula (I) provoke a lowering of the arterial pressure.

The results obtained with a certain number of compounds are given in the following Table IX:

TABLE IX

| Code No. of compound tested | Dose administered (mg./kg./IV) | Reduction of arterial pressure | |
|---|---|---|---|
| | | Intensity (percent) | Duration (mn.) |
| 7180 | 1 | ≈45 | 30 |
| 7181 | 2 | ≈50 | 40 |
| 71107 | 2 | ≈45 | 30 |
| 71368 | 1.5 | ≈55 | >30 |
| 71360 | 1 | ≈40 | >45 |
| 71365 | 1 | ≈50 | >30 |
| 71367 | 1-5 | ≈50 | >45 |
| 71396 | 1 | ≈60 | >50 |

9. Antihistaminic properties

The compounds of formula (I) introduced in the conserving medium are capable of opposing the contractural action of histamine hydrochloride on the isolated ileum of a guinea-pig.

The DE 50 of several of the compounds are given in the following Table X:

TABLE X

| Code No. of compounds tested | DE 50 antihistaminic, μg/ml. |
|---|---|
| 71268 | 1.25 |
| 71360 | 2.5 |
| 71365 | 1.25 |
| 71367 | 1.5 |

This activity is evaluated by taking mepyramine as standard.

The results obtained with several compounds of formula (I), expressed in this manner, are given in the following Table XI:

TABLE XI

| Code No. of compound tested | Antihistaminic activity |
|---|---|
| 7135 | 1/5× mepyramine. |
| 7155 | 1/20× mepyramine. |
| 7180 | 1/5× mepyramine. |
| 7181 | 1/15× mepyramine. |

10. Atropinic properties

The compounds of formula (I), introduced in the conserving medium are capable of opposing the contractural action of acetylcholine on the isolated duodenum of a rat.

By way of examples, the DE 50 of compounds Nos. 71365 and 71367 is 1.25 μg./ml. and 0.75 μg./ml., respectively.

11. Neuroleptic properties

The compounds of formula (I), administered by oral means, are capable of provoking catalepsy in the mouse.

The administration of 50 mg./kg./PO of compound No. 71365 provoke catalepsy in 50% of mice treated.

12. Tranquillising properties

Administered by oral means, the compounds of formula (I) are capable of inhibiting the aggressiveness provoked in the mouse by electric stimulation.

This inhibition is attained by administration of 25 mg./kg./PO of compound No. 71365.

13. Sedative properties

The compounds of formula (I), administered by oral means to the mouse, reduce the number of explorations in an escape enclosure and in actimetry with a pencil of rays and with photoelectric cells and induce narcosis when treated with an infrahypnotic dose of penthiobarbital (30 mg./kg./i.p.).

The results obtained with a certain number of the compounds according to the invention are given in the following Table XII.

TABLE XII

| Code No. of compound tested | Dose administered (mg./kg./PO) | Reduction of number of explorations in— | | Potentiallisation of penthiobarbital (percent) |
|---|---|---|---|---|
| | | An escape enclosure (percent) | Actimetry (percent) | |
| 71365 | 15 | | 50 | |
| | 16 | | | 50 |
| | 25 | 50 | | |
| 71360 | 100 | 37 | | |
| 71367 | 100 | 25 | | |
| 71396 | 100 | 35 | | |

14. Diuretic properties

The compounds of formula (I), administered by oral means to the mouse simultaneously with a volume of 1 ml. of an isotonic solution of sodium chloride per 25 g. of the corporeal weight of the mouse, are capable of provoking an augmentation of the volume of urine emitted by reference to control animals, the volume being measured for 4 hours following administration.

This augmentation is 50% following the administration of 20 mg./kg./PO of compound No. 71365 or 71396.

15. Capillary permeability modificational properties

The compounds of formula (I), administered by oral means to the guinea-pig, are capable of reducing the augmentation of the capillary permeability provoked by the intradermic injection of histamine and evaluated by the diffusion at the level of the papula so formed by a colorant, such as Evans blue or Trypan blue, injected by general means.

By way of example, the compound No. 7135 reduced the capillary permeability by 50% in a dose of 70 mg./kg./PO.

As can be seen from the results expressed above and those shown in the following Table XIII, the difference between the pharmacologically active dose and the lethal dose is sufficiently great to permit the compounds of formula (I) to be used in therapeutics.

TABLE XIII

| Code No. of compound tested | Dose administered (mg./kg./PO) | Percentage mortality |
|---|---|---|
| 7135 | 700 | ~50 |
| 7155 | 300 | ~50 |
| 7156 | 1,550 | ~50 |
| 7180 | 400 | ~50 |
| 7181 | 500 | ~50 |
| 71107 | 1,200 | ~50 |
| 71268 | 1,400 | ~50 |
| 71360 | 2,000 | 0 |
| 71365 | 550 | ~50 |
| 71367 | 1,000 | ~50 |
| 71396 | 3,000 | ~50 |

The compounds of formula (I) are useful in the treatment of diverse originating pains, respiratory insufficiencies, coughs, asthma, allergies, oedemas, visceral and vascular spasms, hypertension, circulatory insufficiencies, gastric hypersecretion, anxiety, neurosis, psychosis, depressions and capillary permeability troubles.

They may be administered by oral means in the form of tablets, dragees and gelules containing 25 to 400 mg. of active ingredient (1 to 5 times a day), in the form of drinkable liquids in doses of 0.1 to 2% (30 to 100 drops, 3 times a day) or in the form of a syrup in a dose of 0.1 to 2% (2 to 6 spoonfuls per day), by parenteral means in the form of injectable ampoules containing 1 to 150 mg. of active ingredient (1 or 2 times a day) and by rectal means in the form of suppositories containing 25 to 400 mg. of active ingredient (1 or 2 times a day).

Accordingly, the present invention relates to a compound of the general formula (I). This compound can be mixed together with a therapeutically-acceptable carrier to form a therapeutic composition.

What we claim is:

1. A compound of the formula

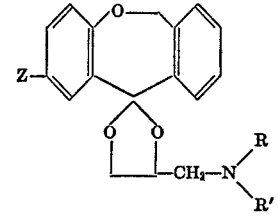

in which Z is hydrogen, alkoxy having 1 to 4 carbon atoms, or halogen, and R and R' each is alkyl having 1 to 3 carbon atoms, or

is pyrrolidino, piperidino, morpholino, hexamethyleneimino, piperazino, or piperazino substituted at N' by alkyl having 1 to 3 carbon atoms, hydroxyalkyl having 1 to 3 carbon atoms and one or two hydroxyl, aminocarbonylmethyl, aminocarbonylmethyl substituted at N by one or two alkyl having 1 to 3 carbon atoms, pyrrolidino, morpholino or hexamethyleneimino, and the pharmacologically acceptable acid addition salts thereof.

2. A compound according to Claim 1, in which Z is hydrogen and R and R' each is methyl.

3. A compound according to Claim 1, in which Z is hydrogen and R and R' each is alkyl having 1 to 3 carbon atoms.

4. A compound according to Claim 1, in which R and R' each is alkyl having 1 to 3 carbon atoms.

5. A compound as claimed in Claim 1, in which Z is hydrogen.

6. A compound as claimed in Claim 1, in which Z is methoxy.

7. A compound as claimed in Claim 1, in which Z is chloro.

8. A compound as claimed in Claim 1, in which

is pyrrolidino, piperidino, morpholino or hexamethyleneimino.

9. A compound as claimed in Claim 1, in which

is piperazino or piperazino substituted at N' by alkyl having 1 to 3 carbon atoms, hydroxyalkyl having 1 to 3 carbon atoms and one or two hydroxyl, aminocarbonylmethyl, aminocarbonylmethyl substituted at N by one or two alkyl having 1 to 3 carbon atoms, pyrrolidino, morpholino or hexamethyleneimino.

References Cited
UNITED STATES PATENTS

| | | | |
|---|---|---|---|
| 3,652,558 | 3/1972 | Lunsford et al. | 260—268 TR |
| 3,718,665 | 2/1973 | Yale | 260—326.81 |
| 3,726,900 | 4/1973 | Fauran et al. | 260—340.9 |
| 3,763,169 | 10/1973 | Malen et al. | 260—293.58 |

RICHARD GALLAGHER, Primary Examiner

U.S. Cl. X.R.

260—247.7 A, 247.7 F, 268 TR, 293.58, 326.81, 340.9; 424—248, 251, 267, 274, 278

UNITED STATES PATENT OFFICE
CERTIFICATE OF CORRECTION

Patent No.      3,845,046      Dated   October 29, 1974

Inventor(s)   Claude P. Fauran, Guy M. Raynaud, Jeannine A. Eberle, Bernard M. Pourrias and Albert Y. Le Cloarec It is certified that error appears in the above-identified patent and that said Letters Patent are hereby corrected as shown below:

Column 10, lines 55-63; please change the formula to read as follows:

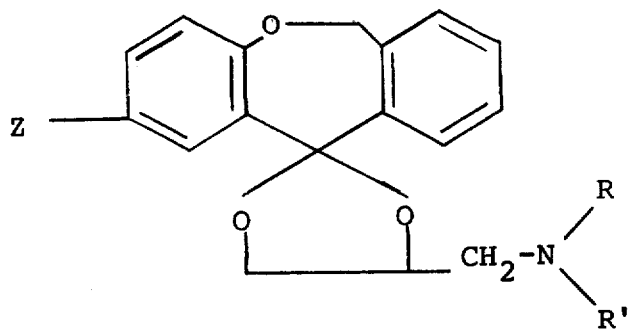

Signed and sealed this 14th day of January 1975.

(SEAL)
Attest:

McCOY M. GIBSON JR.
Attesting Officer

C. MARSHALL DANN
Commissioner of Patents